(12) United States Patent
Qi et al.

(10) Patent No.: US 12,365,808 B2
(45) Date of Patent: Jul. 22, 2025

(54) SELF-CROSSLINKED POLYMERIC DISPERSANT

(71) Applicant: Xerox Corporation, Norwalk, NY (US)

(72) Inventors: Genggeng Qi, Webster, NY (US); Yu Qi, Penfield, NY (US); Chieh-Min Cheng, Rochester, NY (US)

( * ) Notice: Subject to any disclaimer, the term of this patent is extended or adjusted under 35 U.S.C. 154(b) by 879 days.

(21) Appl. No.: 17/533,206

(22) Filed: Nov. 23, 2021

(65) Prior Publication Data

US 2023/0159778 A1    May 25, 2023

(51) Int. Cl.

| | | |
|---|---|---|
| C09D 11/00 | (2014.01) |
| C08F 220/06 | (2006.01) |
| C08F 220/18 | (2006.01) |
| C08F 220/28 | (2006.01) |
| C08F 220/56 | (2006.01) |
| C09D 11/033 | (2014.01) |
| C09D 11/107 | (2014.01) |
| C09D 11/326 | (2014.01) |

(52) U.S. Cl.
CPC .......... *C09D 11/326* (2013.01); *C08F 220/06* (2013.01); *C08F 220/1807* (2020.02); *C08F 220/1818* (2020.02); *C08F 220/286* (2020.02); *C08F 220/56* (2013.01); *C09D 11/033* (2013.01); *C09D 11/107* (2013.01)

(58) Field of Classification Search
CPC . C09D 11/326; C09D 11/0332; C09D 11/107; C08F 220/1818; C08F 220/286; C08F 220/1807; C08F 220/06; C08F 220/56
USPC ................................. 106/31.01, 31.3, 31.86
See application file for complete search history.

(56) References Cited

U.S. PATENT DOCUMENTS

| | | |
|---|---|---|
| 5,389,958 A | 2/1995 | Bui et al. |
| 5,455,315 A | 10/1995 | Paine et al. |
| 8,686,089 B2 | 4/2014 | Li et al. |
| 8,710,117 B2 | 4/2014 | Tanaka et al. |
| 8,871,859 B2 | 10/2014 | Li et al. |
| 9,200,170 B2 | 12/2015 | Lee et al. |

FOREIGN PATENT DOCUMENTS

| | | | | |
|---|---|---|---|---|
| JP | 2012031407 A | * | 2/2012 | ............ C09C 1/644 |
| WO | WO-2019093140 A1 | * | 5/2019 | ........... C09D 11/037 |

OTHER PUBLICATIONS

Genggeng Qi, et al., U.S. Appl. No. 17/533,193, filed Nov. 23, 2021, "Polymeric Dispersant," not yet published.

* cited by examiner

*Primary Examiner* — James E McDonough
(74) *Attorney, Agent, or Firm* — Marylou J. Lavoie, Esq.

(57) ABSTRACT

A self-crosslinked polymeric dispersant including a self-crosslinked polymeric dispersant comprising: a copolymer comprising: an acid group; a base group; a hydrophobic group; and a steric hydrophilic group.

11 Claims, 1 Drawing Sheet

SELF-CROSSLINKED POLYMERIC DISPERSANT

RELATED APPLICATIONS

Commonly assigned U.S. Patent Application No. 17,533,193, filed concurrently herewith, which is hereby incorporated by reference herein in its entirety, describes a polymeric dispersant comprising: a copolymer comprising: a basic moiety; an alkyl group having from about 4 to about 40 carbon atoms; an aromatic group; and a steric hydrophilic group.

BACKGROUND

Disclosed herein is a self-crosslinked polymeric dispersant comprising: a copolymer comprising: an acid group; a base group; a hydrophobic group; and a steric hydrophilic group.

Also disclosed herein is a composition comprising: a particulate; a vehicle; an optional surfactant; and a polymeric dispersant comprising a copolymer of the structure:

wherein $m_1$ is an integer of from 1 to about 400; wherein $m_2$ is an integer of from 0 to about 800; wherein $m_3$ is an integer of from 1 to about 150; wherein $m_4$ is an integer of from 1 to about 400; wherein $m_5$ is an integer of from 1 to about 600; wherein $L_1$ through $L_5$ are optional linking groups; wherein $L_1$ is a linking group selected from a member of the group consisting of ether, urea, epoxy, ester, amide, oxygen, sulfur, carbon, and an alkyl chain of from about 1 to about 6 carbon atoms; wherein $L_2$ is a linking group selected from a member of the group consisting of ether, urea, epoxy, ester, amide, oxygen, sulfur, carbon, and an alkyl chain of from about 1 to about 6 carbon atoms; wherein $L_3$ is a linking group selected from a member of the group consisting of ether, urea, epoxy, ester, amide, oxygen, sulfur, carbon, and an alkyl chain of from about 1 to about 6 carbon atoms; wherein $L_4$ is a linking group selected from a member of the group consisting of ether, urea, epoxy, ester, amide, oxygen, sulfur, carbon, and an alkyl chain of from about 1 to about 6 carbon atoms; wherein $L_5$ is a linking group selected from a member of the group consisting of ether, urea, epoxy, ester, amide, oxygen, sulfur, carbon, and an alkyl chain of from about 1 to about 6 carbon atoms; wherein $R_1$ is —$(CH_2)_{3-39}CH_3$; wherein $R_2$ is an aromatic group; in embodiments, wherein $R_2$ is an aromatic group having from 6 to about 40 carbon atoms in embodiments wherein $R_2$ is selected from a member of the group consisting of benzyl, naphthalenyl, anthracenyl, tetracenyl, and pentacenyl, tristyrylbenzyl, and pyridyl groups; wherein $R_3$ is —$(CH_2CH_2O)_m(CH_2CHCH_3O)_nR$, wherein m is about 10 to about 450, n is about 0 to about 80, and R is H or $CH_3$; wherein $R_4$ is a base group; in embodiments, wherein $R_4$ is a base group selected from a member of the group consisting of an amine, a pyridine, an imidazole, a benzimidazole, a histidine, a guanidine, a phosphazene base, an ammonium base, a phosphonium base, and an onium base; wherein $R_5$ is an acid group; in embodiments wherein $R_5$ is an acid group selected from a member of the group consisting of carboxylic acid, sulfonic acid, phosphonic acid, phenol, and aromatic nitrate; wherein $R_1'$, $R_2'$, $R_3'$, and $R_4'$ are each independently selected from a member of the group consisting of H, an alkyl group having from 1 to about 5 carbon atoms, and an aromatic group having from 6 to about 30 carbon atoms, and $R_5'$ is selected from a member of the group consisting of H, an alkyl group having from 1 to about 5 carbon atoms, an aromatic group having from 6 to about 30 carbon atoms, an acid group selected from a member of the group consisting of carboxylic acid, sulfonic acid, phosphonic acid, phenol, and aromatic nitrate, and combinations thereof. In embodiments, the equations

$$0.05 < \frac{m_1(M_{R_1} + M_{R_1'}) + m_2(M_{R_2} + M_{R_2'})}{\sum_1^5 m_i(M_{R_i} + M_{R_i'})} < 0.8$$

and $$\frac{m_4 M_{R_4}}{m_3 M_{R_3}} < 10$$

are used to define the dispersant components, wherein $M_{Ri}$ is the molecular weight of the $R_i$ group, and $M_{Ri'}$ is the molecular weight of the $R_i'$ group, wherein i is 1 through 5 (that is $R_i$=$R_1$, $R_2$, $R_3$, $R_4$, $R_5$).

Also disclosed is an aqueous ink jet ink comprising: water; a co-solvent; an optional wax dispersion; an optional binder resin, wherein the optional binder resin can be a latex resin or a water dispersible polymer; a surfactant; a pigment; and a polymeric dispersant comprising a copolymer of the structure:

wherein $m_1$ is an integer of from 1 to about 400; wherein $m_2$ is an integer of from 0 to about 800; wherein $m_3$ is an integer of from 1 to about 150; wherein $m_4$ is an integer of from 1 to about 400; wherein $m_5$ is an integer of from 1 to about 600; wherein $L_1$ through $L_5$ are optional linking groups; wherein $L_1$ is a linking group selected from a member of the group consisting of ether, urea, epoxy, ester, amide, oxygen, sulfur, carbon, and an alkyl chain of from about 1 to about 6 carbon atoms; wherein $L_2$ is a linking group selected from a member of the group consisting of ether, urea, epoxy, ester, amide, oxygen, sulfur, carbon, and an alkyl chain of from about 1 to about 6 carbon atoms; wherein $L_3$ is a linking group selected from a member of the group consisting of ether, urea, epoxy, ester, amide, oxygen, sulfur, carbon, and an alkyl chain of from about 1 to about 6 carbon atoms; wherein $L_4$ is a linking group selected from a member of the group consisting of ether, urea, epoxy, ester, amide, oxygen, sulfur, carbon, and an alkyl chain of from about 1 to about 6 carbon atoms; wherein $L_5$ is a linking group selected from a member of the group consisting of ether, urea, epoxy, ester, amide, oxygen, sulfur, carbon, and an alkyl chain of from about 1 to about 6 carbon atoms; wherein $R_1$ is —$(CH_2)_{3-39}CH_3$; wherein $R_2$ is an aromatic group having from 6 to about 40 carbon atoms; in embodiments, wherein $R_2$ is an aromatic group selected from a member of the group consisting of benzyl, naphthalenyl, anthracenyl, tetracenyl, and pentacenyl, tristyrylbenzyl, and pyridyl groups; wherein $R_3$ is $—(CH_2CH_2O)_m(CH_2CHCH_3O)_nR$, wherein m is about 10 to about 450, n is about 0 to about 80, and R is H or $CH_3$; wherein $R_4$ is a base group; in embodiments, wherein $R_4$ is a base group selected from a member of the group consisting of an amine, a pyridine, an imidazole, a benzimidazole, a histidine, a guanidine, a phosphazene base, an ammonium base, a phosphonium base, and an onium base; wherein $R_5$ is an acid group; in embodiments wherein $R_5$ is an acid group selected from a member of the group consisting of carboxylic acid, sulfonic acid, phosphonic acid, phenol, and aromatic nitrate; and wherein $R_1'$, $R_2'$, $R_3'$, and $R_4'$ are each independently selected from a member of the group consisting of H, an alkyl group having from 1 to about 5 carbon atoms, and an aromatic group having from 6 to about 30 carbon atoms, and $R_5'$ is selected from a member of the group consisting of H, an alkyl group having from 1 to about 5 carbon atoms, an aromatic group having from 6 to about 30 carbon atoms, an acid group selected from a member of the group consisting of carboxylic acid, sulfonic acid, phosphonic acid, phenol, and aromatic nitrate, and combinations thereof. In embodiments, the equations $$0.05 < \frac{m_1(M_{R_1} + M_{R_1'}) + m_2(M_{R_2} + M_{R_2'})}{\sum_1^5 m_i(M_{R_i} + M_{R_i'})} < 0.8$$

and $$\frac{m_4 M_{R_4}}{m_3 M_{R_3}} < 10$$

are used to define the dispersant components,
wherein $M_{Ri}$ is the molecular weight of the $R_i$ group, and $M_{Ri'}$ is the molecular weight of the $R_i'$ group, wherein i is 1 through 5 (that is $R_i = R_1$, $R_2$, $R_3$, $R_4$, $R_5$).

Reliable pigment dispersion is an important factor for aqueous ink jet ink applications. Certain pigments, for example, carbon black, are especially difficult to disperse in aqueous media because of their high specific surface areas and/or low surface charge. Various black pigment dispersions made with commercially available dispersants have been attempted to be incorporated into aqueous ink jet inks. However, the resultant inks often exhibited problems such as being unstable in accelerated aging tests or having limited tolerance to ink formulation variation, especially to co-solvent type inks and contents.

While many commercial dispersants may be efficient in dispersing specific pigments, they are less effective for others because of distinctive differences across different types of pigments such as hydrophilicity, morphology, charge, and surface functionality. Poorly dispersed pigments may cause aqueous inks or coatings to have storage instability, jet clogging, low optical density, and to exhibit loss of covering power. A post-crosslinking method has been employed to improve the reliability and robustness of pigments dispersions. In this method, post-crosslinkable dispersants are used to prepare pigments dispersions and then are crosslinked with crosslinking agents such as epoxides, carbodiimides, silanes, and isocyanates.

U.S. Pat. No. 8,686,089, which is hereby incorporated by reference herein in its entirety, describes in the Abstract thereof an aqueous dispersion comprising a solid particle and a polymeric dispersant, wherein the polymeric dispersant is a block copolymer comprising an A block and a B block, wherein the A block is a segment having a block size of about 5 to about 18 units, and comprises at least 50% by weight of a monomer having the following structure: $CH_2=CRC(O)O(CHR_1CH_2O)_nR_2$; wherein R and $R_1$ are H, or methyl; $R_2$ is alkyl of 1-4 carbon atoms or phenyl; and n is about 1 to about 20; and the B block is a segment comprising an ionic monomer and at least one hydrophobic monomer; and wherein the dispersant comprises a crosslinkable moiety; wherein the crosslinkable moiety is crosslinked with a post-crosslinking agent selected from the group consisting of epoxide, carbodiimide, oxazoline, isocyanate, and silane; and wherein the aqueous dispersion has a pH of at least about 8.0.

U.S. Pat. No. 8,871,859, which is hereby incorporated by reference herein in its entirety, describes in the Abstract thereof an aqueous dispersion comprising a solid particle and a structured vinyl polymeric dispersant, wherein said structured vinyl polymer dispersant comprises at least one hydrophilic segment and at least one hydrophobic segment, the hydrophilic segment comprising at least one crosslinkable moiety, wherein the crosslinkable moiety is crosslinked with a post-crosslinking agent that is substantially insoluble in the aqueous ink vehicle.

While this type of method may be suitable for some situations, this method involves post-crosslinking synthesis and additional purification steps and thus increases the cost and complexity of the colorant dispersion preparation process.

Another approach to seek superior pigment dispersion reliability is encapsulation of pigments via post-crosslinking, which involves dispersing pigment core particles with a crosslinkable monomer and then crosslinking with other monomers or crosslinkers to form a protective shell around the pigment core particles.

U.S. Pat. No. 8,710,117, which is hereby incorporated by reference herein in its entirety, describes in the Abstract thereof crosslinked core/shell polymer particles containing a pigment which are usable in a water-based ink for ink-jet printing and exhibit excellent optical density and gloss and are prevented from suffering from occurrence of bronzing, wherein the polymer particles each include a core portion and shell portion which are respectively made of a crosslinked polymer, and a weight ratio of the pigment to the pigment-containing crosslinked core/shell polymer particles [(weight of the pigment/weight of the pigment-containing crosslinked core/shell polymer particles)×100] is from 25 to 75.

U.S. Pat. No. 9,200,170, which is hereby incorporated by reference herein in its entirety, describes in the Abstract thereof an inkjet ink comprising an aqueous vehicle and an encapsulated pigment dispersion. A process for encapsulating pigments is provided where a pigment is dispersed with a polymeric dispersant in an aqueous solvent system. The free polymer dispersant in the pigment dispersion is limited to less than 0.12 grams per gram of pigment. This dispersed pigment is then encapsulated by adding acrylate monomers and optionally acrylic and vinyl monomers and polymerizing. In the encapsulated pigment dispersion the weight ratio of final free polymer to polymer found to the final encapsulated pigment is less than 0.9. The free polymer dispersant is measured by a centrifugation method and the final free polymer is measured by a density gradient centrifugation method.

While these post-encapsulation methods may be effective for preparing robust pigment dispersions, they also involve multiple synthesis and purification steps and thus greatly increase the cost and complexity of the dispersion manufacturing process.

Currently available dispersants may be suitable for their intended purposes. However a need remains for improved dispersants, particularly for improved dispersants for aqueous ink jet inks. A need further remains for improved dispersants that can be successfully employed for dispersing a wide variety of pigments. A need further remains for a high efficiency dispersant that can be applied for dispersing a wide scope of different types of pigments while also achieving superior pigment dispersion and reliability.

The appropriate components and process aspects of the each of the foregoing U. S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a self-crosslinked polymeric dispersant comprising: a copolymer comprising: an acid group; a base group; a hydrophobic group; and a steric hydrophilic group.

Further described is a composition comprising: a particulate; a vehicle; an optional surfactant; and a polymeric dispersant comprising a copolymer of the structure:

wherein $m_1$ is an integer of from 1 to about 400; wherein $m_2$ is an integer of from 0 to about 800; wherein $m_3$ is an integer of from 1 to about 150; wherein $m_4$ is an integer of from 1 to about 400; wherein $m_5$ is an integer of from 1 to about 600; wherein $L_1$ through $L_5$ are optional linking groups; wherein $L_1$ is a linking group selected from a member of the group consisting of ether, urea, epoxy, ester, amide, oxygen, sulfur, carbon, and an alkyl chain of from about 1 to about 6 carbon atoms; wherein $L_2$ is a linking group selected from a member of the group consisting of ether, urea, epoxy, ester, amide, oxygen, sulfur, carbon, and an alkyl chain of from about 1 to about 6 carbon atoms; wherein $L_3$ is a linking group selected from a member of the group consisting of ether, urea, epoxy, ester, amide, oxygen, sulfur, carbon, and an alkyl chain of from about 1 to about 6 carbon atoms; wherein $L_4$ is a linking group selected from a member of the group consisting of ether, urea, epoxy, ester, amide, oxygen, sulfur, carbon, and an alkyl chain of from about 1 to about 6 carbon atoms; wherein $L_5$ is a linking group selected from a member of the group consisting of ether, urea, epoxy, ester, amide, oxygen, sulfur, carbon, and an alkyl chain of from about 1 to about 6 carbon atoms; wherein $R_1$ is —$(CH_2)_{3-39}CH_3$; wherein $R_2$ is an aromatic group having from 6 to about 40 carbon atoms; in embodiments, wherein $R_2$ is an aromatic group selected from a member of the group consisting of benzyl, naphthalenyl, anthracenyl, tetracenyl, pentacenyl, tristyrylbenzyl, and pyridyl groups; wherein $R_3$ is —$(CH_2CH_2O)_m(CH_2CHCH_3O)_nR$, wherein m is about 10 to about 450, n is about 0 to about 80, and R is H or $CH_3$; wherein $R_4$ is a base group; in embodiments, wherein $R_4$ is a base group selected from a member of the group consisting of an amine, a pyridine, an imidazole, a benzimidazole, a histidine, a guanidine, a phosphazene base, an ammonium base, a phosphonium base, and an onium base; wherein $R_5$ is an acid group; in embodiments wherein $R_5$ is an acid group selected from a member of the group consisting of carboxylic acid, sulfonic acid, phosphonic acid, phenol, and aromatic nitrate; and wherein $R_1'$, $R_2'$, $R_3'$, and $R_4'$ are each independently selected from a member of the group consisting of H, an alkyl group having from 1 to about 5 carbon atoms, and an aromatic group having from 6 to about 30 carbon atoms, and $R_5'$ is selected from a member of the group consisting of H, an alkyl group having from 1 to about 5 carbon atoms, an aromatic group having from 6 to about 30 carbon atoms, an acid group selected from a member of the group consisting of carboxylic acid, sulfonic acid, phosphonic acid, phenol, and aromatic nitrate, and combinations thereof. In embodiments, the equations

$$0.05 < \frac{m_1(M_{R_1} + M_{R_1'}) + m_2(M_{R_2} + M_{R_2'})}{\sum_1^5 m_i(M_{R_i} + M_{R_i'})} < 0.8$$

and $$\frac{m_4 M_{R_4}}{m_3 M_{R_3}} < 10$$

are used to define the dispersant components, wherein $M_{Ri}$ is the molecular weight of the $R_i$ group, and $M_{Ri'}$ is the molecular weight of the $R_i'$ group, wherein i is 1 through 5 (that is $R_i$=$R_1$, $R_2$, $R_3$, $R_4$, $R_5$).

Further described is an aqueous ink jet ink comprising: water; a co-solvent; an optional wax dispersion; an optional binder resin; a surfactant; a pigment; and a polymeric dispersant comprising a copolymer of the structure:

wherein $m_1$ is an integer of from 1 to about 400; wherein $m_2$ is an integer of from 0 to about 800; wherein $m_3$ is an integer of from 1 to about 150; wherein $m_4$ is an integer of from 1 to about 400; wherein $m_5$ is an integer of from 1 to about 600; wherein $L_1$ through $L_5$ are optional linking groups; wherein $L_1$ is a linking group selected from a member of the group consisting of ether, urea, epoxy, ester, amide, oxygen, sulfur, carbon, and an alkyl chain of from about 1 to about 6 carbon atoms; wherein $L_2$ is a linking group selected from a member of the group consisting of ether, urea, epoxy, ester, amide, oxygen, sulfur, carbon, and an alkyl chain of from about 1 to about 6 carbon atoms; wherein $L_3$ is a linking group selected from a member of the group consisting of ether, urea, epoxy, ester, amide, oxygen, sulfur, carbon, and an alkyl chain of from about 1 to about 6 carbon atoms; wherein $L_4$ is a linking group selected from a member of the group consisting of ether, urea, epoxy, ester, amide, oxygen, sulfur, carbon, and an alkyl chain of from about 1 to about 6 carbon atoms; wherein $L_5$ is a linking group selected from a member of the group consisting of ether, urea, epoxy, ester, amide, oxygen, sulfur, carbon, and an alkyl chain of from about 1 to about 6 carbon atoms; wherein $R_1$ is —$(CH_2)_{3-39}CH_3$; wherein $R_2$ is an aromatic group; in embodiments, wherein $R_2$ is an aromatic group having from 6 to about 40 carbon atoms; in embodiments, wherein $R_2$ is selected from a member of the group consisting of benzyl, naphthalenyl, anthracenyl, tetracenyl, pentacenyl, tristyrylbenzyl, and pyridyl groups; wherein $R_3$ is —$(CH_2CH_2O)_m(CH_2CHCH_3O)_nR$, wherein m is about 10 to about 450, n is about 0 to about 80, and R is H or $CH_3$; wherein $R_4$ is a base group; in embodiments, wherein $R_4$ is a base group selected from a member of the group consisting of an amine, a pyridine, an imidazole, a benzimidazole, a histidine, a guanidine, a phosphazene base, an ammonium base, a phosphonium base, and an onium base; wherein $R_5$ is an acid group; in embodiments wherein $R_5$ is an acid group selected from a member of the group consisting of carboxylic acid, sulfonic acid, phosphonic acid, phenol, and aromatic nitrate; and wherein $R_1'$, $R_2'$, $R_3'$, and $R_4'$ are each independently selected from a member of the group consisting of H, an alkyl group having from 1 to about 5 carbon atoms, and an aromatic group having from 6 to about 30 carbon atoms, and $R_5'$ is selected from a member of the group consisting of H, an alkyl group having from 1 to about 5 carbon atoms, an aromatic group having from 6 to about 30 carbon atoms, an acid group selected from a member of the group consisting of carboxylic acid, sulfonic acid, phosphonic acid, phenol, and aromatic nitrate, and combinations thereof. In embodiments, the equations $$0.05 < \frac{m_1(M_{R_1} + M_{R_1'}) + m_2(M_{R_2} + M_{R_2'})}{\sum_1^5 m_i(M_{R_i} + M_{R_i'})} < 0.8$$

and $$\frac{m_4 M_{R_4}}{m_3 M_{R_3}} < 10$$

are used to define the dispersant components, wherein wherein $M_{Ri}$ is the molecular weight of the $R_i$ group, and $M_{Ri'}$ is the molecular weight of the $R_i'$ group, wherein i is 1 through 5 (that is Ri=$R_1$, $R_2$, $R_3$, $R_4$, $R_5$).

DETAILED DESCRIPTION

Figure 1:
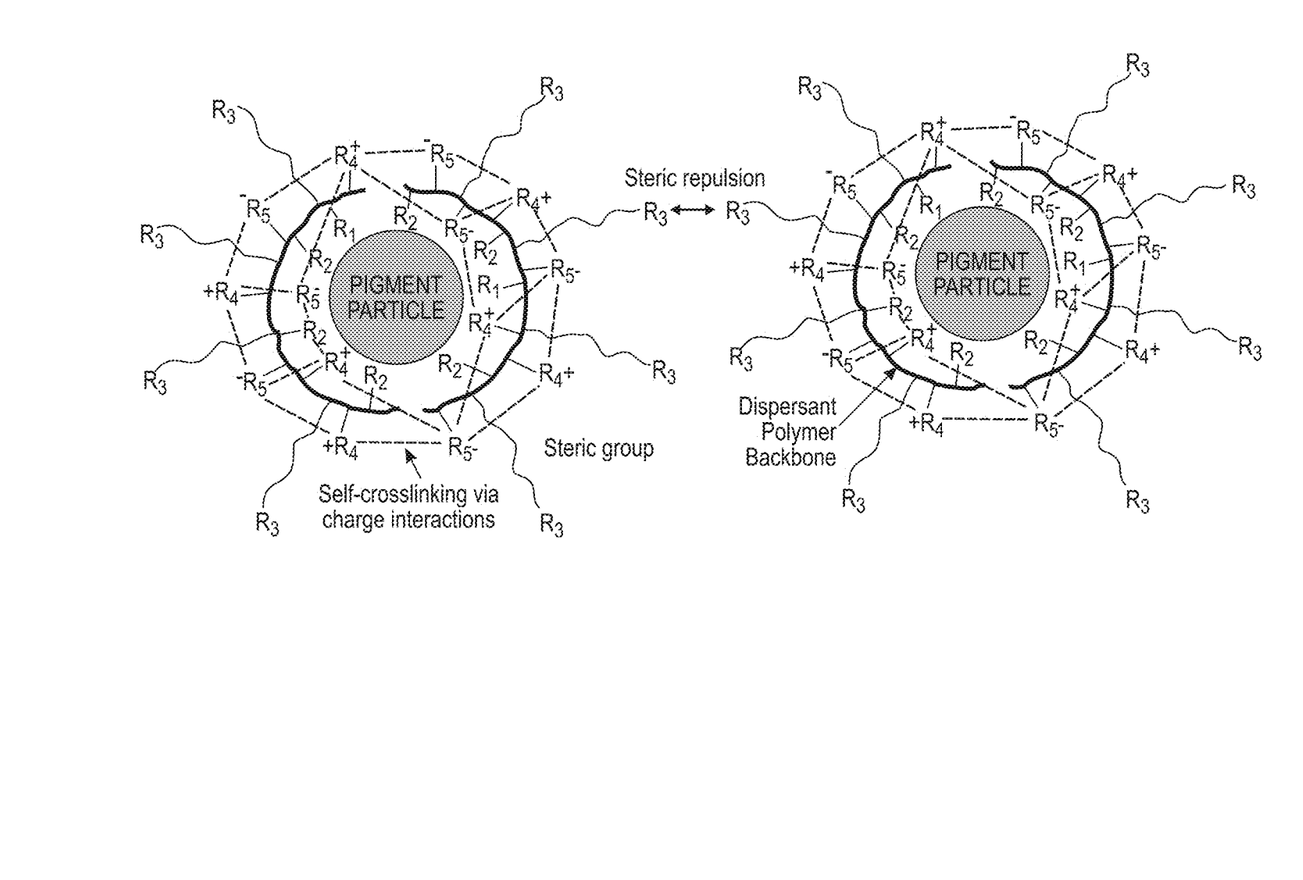
The FIGURE is an illustration showing the self-crosslinking of the pigment dispersion in accordance with the present embodiments.

A polymeric pigment dispersant is described containing an acid group, a base group, a hydrophobic group, and a steric group. In specific embodiments, the polymer is a vinyl polymer; the hydrophobic group includes an alkyl group and/or an aromatic moiety; and the steric group is selected from a member of the group consisting of polyethylene glycol, polypropylene glycol, and combinations thereof. Furthermore, the acid and base group can interact with one another to form a crosslinking network at the pigment particle surface to provide dispersion stability for a wide range of pigments. The present dispersant can be used in the same manner as conventional dispersants in pigment dispersion preparation. The present dispersant forms crosslinked dispersions in situ via intramolecular/intermolecular charge interactions without the need for additional purification thus providing an advantage over post-crosslinkable dispersants or pigment encapsulation which require additional synthesis and purification steps.

The present polymeric dispersant can be used for any suitable or desired particulate dispersant application. Particulates which can be dispersed by the present self-crosslinked polymeric dispersant include oxide particles, metal particles, dyes, pigments, and combinations thereof. In embodiments, the present polymeric dispersant is used to make cyan, magenta, yellow, white, or black (CMWYK) pigment dispersions. Pigment dispersions prepared with the present self-crosslinked dispersant show superior stability in the ink formulation upon aging at a high co-solvent loading over prior conventional non-crosslinked dispersants. By high co-solvent loading, it is meant that co-solvent is present in the ink composition in an amount of above 30 percent by weight based on the total weight of the ink formulation. The present self-crosslinked dispersant enables a wider latitude for ink formulation than noncrosslinked counterparts while also providing good printing and coating performance, such as high gloss, image robustness, excellent ink spread property, and less humidity sensitivity. The process for making the present dispersant is cost-effective and manufacturable.

Thus, a cost-effective, self-crosslinked polymeric dispersant is described suitable to disperse various particulates, in embodiments various pigments, for waterborne coating and aqueous ink applications. In contrast to the post-crosslinking dispersants and pigment encapsulation methods, the present dispersant can be used in the same manner as conventional dispersants. Referring to the FIGURE, an illustration of the self-crosslinking of the pigment dispersion in accordance with the present embodiments is shown. Due to the steric stability provided by the steric groups, the interparticle ionic interactions between the dispersed pigment particles is minimized which is beneficial for reducing the viscosity of pigment dispersions. Steric repulsion is shown in the FIGURE such as between $R_3$ steric groups. The present dispersant self-crosslinks in situ via the strong intramolecular/intermolecular ionic interactions between the acid and base groups, providing the pigment dispersion with enhanced stability against high co-solvent contents in aqueous inks. Self-crosslinking is shown in the FIGURE via charge interactions such as between $R_4^+$ and $R_5^-$ groups.

In embodiments, the polymeric dispersant comprises: an acid group, a base group, a hydrophobic group, and a steric group. In specific embodiments, the polymer is a vinyl polymer; the hydrophobic group includes an alkyl group and/or an aromatic moiety; and the steric group is a member selected from the group consisting of polyethylene glycol, polypropylene glycol, and combinations thereof.

The polymeric dispersant contains an acid group. In embodiments, the acid group (also called acid moiety) is selected from a member of the group consisting of carboxylic acid, phosphoric acid, sulphonic acid, phenol, aromatic nitrate, and combinations thereof.

The polymeric dispersant contains a base group also described as a basic moiety. In embodiments, the base group is selected from a member of the group consisting of an aromatic amine, an aliphatic amine, pyridine, and combinations thereof. In further embodiments, the base group is selected from a member of the group consisting of an aromatic amine, an aliphatic amine, pyridine, imidazole, benzimidazole, histidine, guanidine, a phosphazene base, an ammonium base, a phosphonium base, an onium base, and combinations thereof.

The acid and base groups can be incorporated either in the polymer backbone or as a pendent group linked to the backbone of the polymeric dispersant. In embodiments the copolymer polymeric dispersant comprises a backbone and the basic moiety is incorporated in the backbone or the basic moiety is a pendant group linked to the backbone.

The polymeric dispersant contains an alkyl group. In embodiments, the alkyl group comprises an alkyl group having from about 4 to about 40 carbon atoms.

In embodiments, the hydrophobic group is selected from a member of the group consisting of an alkyl group having from about 4 to about 40 carbon atoms; an aromatic group; and combinations thereof. In embodiments, the aromatic group can be a member selected from the group consisting of benzyl, naphthalenyl, anthracenyl, tetracenyl, pentacenyl, tristyrylbenzyl, and pyridiyl.

The polymeric dispersant contains a steric hydrophilic group. In embodiments, the steric hydrophilic group comprises a member selected from the group consisting of polyethylene glycol, polypropylene glycol, and combinations thereof. In embodiments, the steric hydrophilic group comprises polyethylene glycol. In a specific embodiment, the steric hydrophilic group comprises polyethylene glycol having a weight average molecular weight of from about 500 to about 20,000, or from about 500 to about 11,000, or from about 500 to about 5,000.

In a specific embodiment, the steric hydrophilic group comprises polyethylene glycol having a weight average molecular weight of from about 500 to about 5,000. Polyethylene glycol, in embodiments with a weight average molecular weight of from about 500 to about 5,000 provides stability via steric effect and compatibility with the dispersing medium.

Molecular weight is determined by gel permeation chromatography (GPC) according to the usual methods. Weight average molecular weight may be determined by GPC using polystyrene standards.

The dispersant polymer comprises a hydrophobic group (alkyl and/or an aromatic group), a steric hydrophilic group, an acidic moiety, and a basic moiety. The acid, base, aromatic, and alkyl groups function as pigment-affinic anchors, allowing the dispersant the ability to be applied to a wide scope of pigments.

In embodiments, the polymeric dispersant is a copolymer is of the structure:

wherein $m_1$ is an integer of from 1 to about 400; wherein $m_2$ is an integer of from 0 to about 800; wherein $m_3$ is an integer of from 1 to about 150; wherein $m_4$ is an integer of from 1 to about 400; wherein $m_5$ is an integer of from 1 to about 600; wherein $L_1$ through $L_5$ are optional linking groups; wherein $L_1$ is a linking group selected from a member of the group consisting of ether, urea, epoxy, ester, amide, oxygen, sulfur, carbon, and an alkyl chain of from about 1 to about 6 carbon atoms; wherein $L_2$ is a linking group selected from a member of the group consisting of ether, urea, epoxy, ester, amide, oxygen, sulfur, carbon, and an alkyl chain of from about 1 to about 6 carbon atoms; wherein $L_3$ is a linking group selected from a member of the group consisting of ether, urea, epoxy, ester, amide, oxygen, sulfur, carbon, and an alkyl chain of from about 1 to about 6 carbon atoms; wherein $L_4$ is a linking group selected from a member of the group consisting of ether, urea, epoxy, ester, amide, oxygen, sulfur, carbon, and an alkyl chain of from about 1 to about 6 carbon atoms; wherein $L_5$ is a linking group selected from a member of the group consisting of ether, urea, epoxy, ester, amide, oxygen, sulfur, carbon, and an alkyl chain of from about 1 to about 6 carbon atoms; wherein $R_1$ is $-(CH_2)_{3-39}CH_3$; wherein $R_2$ is an aromatic group having from 6 to about 40 carbon atoms; in embodiments, wherein $R_2$ is an aromatic group selected from a member of the group consisting of benzyl, naphthalenyl, anthracenyl, tetracenyl, pentacenyl, tristyrylbenzyl, and pyridyl groups; wherein $R_3$ is $-(CH_2CH_2O)_m(CH_2CHCH_3O)_nR$, wherein m is about 10 to about 450, n is about 0 to about 80, and R is H or $CH_3$; wherein $R_4$ is a base group; in embodiments, wherein $R_4$ is a base group selected from a member of the group consisting of an amine, a pyridine, an imidazole, a benzimidazole, a histidine, a guanidine, a phosphazene base, an ammonium base, a phosphonium base, and an onium base; wherein $R_5$ is an acid group; in embodiments wherein $R_5$ is an acid group selected from a member of the group consisting of carboxylic acid, sulfonic acid, phosphonic acid, phenol, and aromatic nitrate; and wherein $R_1'$, $R_2'$, $R_3'$, and $R_4'$ are each independently selected from a member of the group consisting of H, an alkyl group having from 1 to about 5 carbon atoms, and an aromatic group having from 6 to about 30 carbon atoms, and $R_5'$ is selected from a member of the group consisting of H, an alkyl group having from 1 to about 5 carbon atoms, an aromatic group having from 6 to about 30 carbon atoms, an acid group selected from a member of the group consisting of carboxylic acid, sulfonic acid, phosphonic acid, phenol, and aromatic nitrate, and combinations thereof. In embodiments, the equations $$0.05 < \frac{m_1(M_{R_1} + M_{R_1'}) + m_2(M_{R_2} + M_{R_2'})}{\sum_{i=1}^{5} m_i(M_{R_i} + M_{R_i'})} < 0.8$$

and $$\frac{m_4 M_{R_4}}{m_3 M_{R_3}} < 10$$

are used to define the dispersant components, wherein $M_{Ri}$ is the molecular weight of the $R_i$ group, and $M_{Ri'}$ is the molecular weight of the $R_i'$ group, wherein i is 1 through 5 (that is $R_i = R_1, R_2, R_3, R_4, R_5$). In embodiments, $m_1$ is an integer of from 1 to about 400; $m_2$ is an integer of from 0 to about 800; $m_3$ is an integer of from 1 to about 150; $m_4$ is an integer of from 1 to about 400; wherein $m_5$ is an integer of from 1 to about 600.

Thus, in embodiments, the equations $$0.05 < \frac{m_1(M_{R_1} + M_{R_1'}) + m_2(M_{R_2} + M_{R_2'})}{\sum_{i=1}^{5} m_i(M_{R_i} + M_{R_i'})} < 0.8$$

and

-continued

$$\frac{m_4 M_{R_4}}{m_3 M_{R_3}} < 10$$

are used to define the dispersant components;
wherein $M_{R1}$ is the molecular weight of the $R_1$ group;
wherein $M_{R1'}$ is the molecular weight of the $R_{1'}$ group;
wherein $M_{R2}$ is the molecular weight of the $R_2$ group;
wherein $M_{R2'}$ is the molecular weight of the $R_{2'}$ group;
wherein $M_{Ri}$ is the molecular weight of the $R_i$ group;
wherein $M_{Ri'}$ is the molecular weight of the $R_{i'}$ group;
wherein i is 1 through 5 (that is $R_i = R_1$, $R_2$, $R_3$, $R_4$, $R_5$); and
wherein $m_1$ is an integer of from 1 to about 400; $m_2$ is an integer of from 0 to about 800; $m_3$ is an integer of from 1 to about 150; $m_4$ is an integer of from 1 to about 400, and wherein $m_5$ is an integer of from 1 to about 600.

In embodiments, the polymeric dispersant is free of, that is does not contain, alkyl phenol ethoxylate (APE) thus placing the present dispersant in the category of environmentally friendly non-APE dispersants.

The polymeric dispersant herein can be synthesized by a manufacturable solution polymerization process. Since the dispersant is compatible with a wide variety of film-forming polymer resins and binders by design, the pigment dispersion prepared using the present polymeric dispersant enables the aqueous ink or coating to have superior storage stability, reliable jetting quality, and enhanced color strength.

The polymeric dispersant herein can be used for any suitable or desired composition. In embodiments, provided herein is a composition comprising: a particulate; a vehicle; and optional surfactant; and a polymeric dispersant as described herein, in embodiments, wherein the polymeric dispersant comprises a copolymer of the structure:

wherein $R_1'$, $R_2'$, $R_3'$, $R_4'$, $R_5'$, $m_1$, $m_2$, $m_3$, $m_4$, $M_5$, $L_1$, $L_2$, $L_3$, $L_4$, $L_5$, $R_1$, $R_2$, $R_3$, $R_4$, and $R_5$ are as described hereinabove.

The polymeric dispersant herein can be used to disperse any suitable or desired particulate including, but not limited to, pigments. In embodiments, a composition is provided comprising: a particulate; a vehicle; an optional surfactant; and a polymeric dispersant as described herein, wherein the particulate is a pigment. In further embodiments, the particulate is a pigment selected from a member of the group consisting of black pigment, carbon black pigment, white pigment, cyan pigment, magenta pigment, yellow pigment, and combinations thereof. In a certain embodiment, the particulate is a carbon black pigment.

The composition can include any suitable or desired vehicle. In embodiments, the vehicle is water. In further embodiments, the vehicle comprises water and a co-solvent. In certain embodiments, the vehicle comprises water and a co-solvent; wherein the co-solvent is present in a high amount of above 30 percent by weight based upon the total weight of the composition, in embodiments, based upon the total weight of the ink composition.

The composition may further include a surfactant. In embodiments, the surfactant is a member of the group consisting of alkyl esters, aromatic esters, siloxane polyethers, ethoxylated acetylenic diols, alcohol ethoxylate, and combinations thereof. In other embodiments, the surfactant is selected from a member of the group consisting of siloxane polyethers, ethoxylated acetylenic diols, alcohol ethoxylate, and combinations thereof.

In embodiments, an aqueous ink jet ink is described comprising: water; a co-solvent; an optional wax dispersion; an optional binder resin; a surfactant; a pigment; and a polymeric dispersant as described herein, in embodiments wherein the polymeric dispersant comprises a copolymer of the structure:

wherein $R_1'$, $R_2'$, $R_3'$, $R_4'$, $R_5'$, $m_1$, $m_2$, $m_3$, $m_4$, $m_5$, $L_1$, $L_2$, $L_3$, $L_4$, $L_5$, $R_1$, $R_2$, $R_3$, $R_4$, and $R_5$ are as described hereinabove.

The ink compositions herein can consist solely of water, or can comprise a mixture of water and a water soluble or water miscible component, referred to as a co-solvent, humectant, or the like (hereinafter co-solvent) such as alcohols and alcohol derivatives, including aliphatic alcohols, aromatic alcohols, dials, glycol ethers, polyglycol ethers, primary aliphatic alcohols, secondary aliphatic alcohols, 1,2-alcohols, 1,3-alcohols, 1,5-alcohols, ethylene glycol alkyl ethers, propylene glycol alkyl ethers, methoxylated glycerol, ethoxylated glycerol, higher homologues of polyethylene glycol alkyl ethers, and the like, with specific examples including ethylene glycol, propylene glycol, diethylene glycols, glycerine, dipropylene glycols, polyethylene glycols, polypropylene glycols, trimethylolpropane, 1,5-pentanediol, 2-methyl-1,3, -propanediol, 2-ethyl-2-hydroxymethyl-1,3-propanediol, 3-methoxybutanol, 3-methyl-1,5-pentanediol, 1,3-propanediol, 1,4-butanediol, 2,4-heptanediol, and the like; also suitable are amides, ethers, urea, substituted ureas such as thiourea, ethylene urea, alkylurea, alkylthiourea, dialkylurea, and dialkylthiourea, carboxylic acids and their salts, such as 2-methylpentanoic acid, 2-ethyl-3-propylacrylic acid, 2-ethyl-hexanoic acid, 3-ethoxyproponic, acid, and the like, esters, organosulfides, organosulfoxides, sulfones (such as sulfolane), carbitol, butyl carbitol, cellusolve, ethers, tripropylene glycol monomethyl ether, ether derivatives, hydroxyethers, amino alcohols, ketones, N-methylpyrrolidinone, 2-pyrrolidinone, cyclohexylpyrrolidone, amides, sulfoxides, lactones, polyelectrolytes, methyl sulfonylethanol, imidazole, 1,3-dimethyl-2-imidazolidinone, betaine, sugars, such as 1-deoxy-D-galactitol, mannitol, inositol, and the like, substituted and unsubstituted formamides, substituted and unsubstituted acetamides, and other water soluble or water miscible materials, as well as mixtures thereof. In embodiments, the co-solvent is selected from a member of the group consisting of 1,2-propanediol, ethylene glycol, N-methylpyrrolidone, methoxylated glycerol, ethoxylated glycerol, and mixtures thereof.

When mixtures of water and water soluble or miscible organic solvent liquids are selected as the liquid vehicle, the water to organic co-solvent ratio ranges can be any suitable or desired ratio, in embodiments from about 100:0 to about 30:70, or from about 97:3 to about 40:60, or from about 95:5 to about 60:40. The non-water component of the liquid vehicle generally serves as a humectant or co-solvent which has a boiling point higher than that of water (100° C.). The co-solvent selected is one that will mix with water without phase separation; thus, a co-solvent having a polarity that is compatible with water is selected. The organic component of the ink vehicle can also serve to modify ink surface tension, modify ink viscosity, dissolve or disperse the colorant, and/or affect the drying characteristics of the ink. In embodiments, the ink is more attracted to paper substrates than plastic media as in solvent-based inks.

The water soluble or water miscible organics which are used in the ink formulation can help with surface tension, drying, leveling, etc. In embodiments, water makes up over 50% of the formulation, in embodiments water comprises from about 60 to about 70% of the ink composition. Thus, the ink compositions herein are mainly aqueous.

In certain embodiments, the co-solvent is selected from the group consisting of sulfolane, methyl ethyl ketone, isopropanol, 2-pyrrolidinone, polyethylene glycol, and mixtures thereof.

The total amount of liquid vehicle can be provided in any suitable or desired amount. In embodiments, the liquid vehicle is present in the ink composition in an amount of from about 75 to about 97 percent, or from about 80 to about 95 percent, or from about 85 to about 95 percent, by weight, based on the total weight of the ink composition.

In embodiments, the aqueous ink jet ink comprises a pigment and a polymeric dispersant as described herein, wherein the pigment and the polymeric dispersant are provided together in the form of a pigment dispersion.

In embodiments, the aqueous ink jet ink is free of alkyl phenol ethoxylates.

The aqueous ink jet ink can include any suitable or desired pigment as is known in the aqueous ink jet ink art including the pigments descried herein. In embodiments, the pigment is carbon black.

The particle size is defined by the diameter of an equivalent sphere having the same volume as the actual pigment particle. Dx represents the x % of particles in the dispersions are smaller than the size based on a volume distribution, e.g. D10 represents the 10% of particles in the media are smaller than this size. My is the volume mean diameter of the pigment particles in the media. The particulate, in embodiments, the pigment, may be provided in the form of a particulate or pigment dispersion. In embodiments, the pigment dispersion has a volume-weighted mean diameter of from about 20 to about 500 nanometers (nm), or from about 20 to about 400 nm, or from about 30 to about 300 nm. In embodiments, the dispersion comprises a particulate, in embodiments, a pigment, the polymeric dispersant as described herein, and an optional surfactant. The particle size (volume-weighted mean diameter) is measured at room temperature via a dynamic light scattering particle size analyzer, e.g. a NANOTRAC FLEX or Malvern Mastersizer. The analyzer was operated in backscatter mode at an angle of 173. Samples were diluted with deionized water and equilibrated at 25° C. for 120 seconds prior to measurement.

Examples of suitable pigments include black pigments, white pigments, cyan pigments, magenta pigments, yellow pigments, and the like. Further, pigments can be organic or inorganic particles. Suitable inorganic pigments include carbon black. However, other inorganic pigments may be suitable such as titanium oxide, cobalt blue ($CoO-Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, anthanthrone pigments such as PR168, and the like. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 5000, and RAVEN 3500; Evonik pigments such as Color Black FW 200, FW 2, FW 2V, FW 1, FW18, FW S160, FW S170, Special Black 6, Special Black 5, Special Black 4A, Special Black 4, PRINTEX U, PRINTEX 140U, PRINTEX V, and PRINTEX 140V. The above list of pigments includes unmodified pigment particulates, small molecule attached pigment particulates, and polymer-dispersed pigment particulates. Other pigments can also be selected, as well as mixtures thereof. The pigment particle size is desired to be as small as possible to enable a stable colloidal suspension of the particles in the liquid vehicle and to prevent clogging of the ink channels when the ink is used in a thermal ink jet printer or a piezoelectric ink jet printer.

The particulate, such as pigment, can be present in the ink composition in any desired or effective amount, in embodiments, the pigment can be present in an amount of from about 0.05 to about 15 percent, or from about 0.1 to about 10 percent, or from about 1 to about 5 percent by weight, based on the total weight of the ink composition.

The inks disclosed may also contain a wax which may be provided in the form of a wax dispersion. Any suitable or desired wax can be selected and will depend on the end product.

In embodiments, the wax is selected from the group consisting of polyolefins, carnauba wax, rice wax, candelilla wax, sumacs wax, jojoba oil, beeswax, montan wax, ozokerite, ceresin, paraffin wax, microcrystalline wax, Fischer-Tropsch wax, stearyl stearate, behenyl behenate, butyl stearate, propyl oleate, glyceride monostearate, glyceride distearate, pentaerythritol tetra behenate, diethyleneglycol monostearate, dipropyleneglycol distearate, diglyceryl distearate, triglyceryl tetrastearate, sorbitan monostearate, polyethylene wax, ester wax, amide wax, fatty acids, fatty alcohols, fatty amides, and combinations thereof.

The wax, if present, may be present in the aqueous ink composition in any suitable or desired amount. In embodiments, the wax is present in the form of a wax dispersion and the wax dispersion is present in the aqueous ink composition in an amount of from about 0 to about 10, or from about 0.1 to about 5, or from about 0.1 to about 2 percent by weight based on the total weight of the aqueous ink composition.

The inks disclosed may also contain a binder resin which may be provided in the form of a latex or an aqueous dispersion. Any suitable or desired binder resin can be selected and will depend on the end product.

In embodiments, the binder resin is selected from a member of the group consisting of styrene, substituted styrenes, and derivatives thereof. The binder resin is, in embodiments, a resin prepared by polymerization of at least one monomer, wherein, in embodiments, the monomer is a free radical reactive olefin compound selected from the group consisting of styrenes, dienes, acrylate esters, vinyl acetates, and mixtures thereof. In embodiments, the binder resin is a resin as described in U.S. Pat. No. 5,455,315, which is hereby incorporated by reference herein in its entirety.

The inks disclosed may also include a resin such as in the form of a latex, a water dispersable resin, and a water soluble resin. Any suitable or desired resin can be selected. In embodiments, the resin is selected from a member of the group consisting of benzene, carboxylic acid, alkyl acrylate, and combinations thereof.

The resin can be present in the aqueous ink jet ink in any suitable or desired amount. In embodiments, the resin is present in the ink jet ink in an amount of from about 1 to about 10, or from about 3 to about 8, or from about 4 to about 6 percent by weight, based upon the total weight of the ink composition.

The inks disclosed may also contain a surfactant. Examples of suitable surfactants include ionic surfactants, anionic surfactants, cationic surfactants, nonionic surfactants, zwitterionic surfactants, and the like, as well as mixtures thereof. Examples of suitable surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like, with specific examples including primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethylstearylamine, stearyldimethylbetaine, and lauryldihydroxyethylbetaine; fluorosurfactants; and the like, as well as mixtures thereof. Additional examples of nonionic surfactants include polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc as IGEPAL CA-210™ IGEPAL CA-520™, IGEPAL CA-720™, IGEPAL CO-890™, IGEPAL CO-720™, IGEPAL CO-290™, IGEPAL CA-210™, ANTAROX$^{890}$™, and ANTAROX$^{897}$™. Other examples of suitable nonionic surfactants include a block copolymer of polyethylene oxide and polypropylene oxide, including those commercially available as SYNPERONIC™ PE/F, such as SYNPERONIC™ PE/F 108. Other examples of suitable anionic surfactants include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Sigma-Aldrich, NEOGEN R™, NEOGEN SC™ available from Daiichi Kogyo Seiyaku, combinations thereof, and the like. Other examples of suitable anionic surfactants include DOWFAX™ 2A1, an alkyldiphenyloxide disulfonate from Dow Chemical Company, and/or TAYCA POWER BN2060 from Tayca Corporation (Japan), which are branched sodium dodecyl benzene sulfonates. Other examples of suitable cationic surfactants, which are usually positively charged, include alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C12, C15, C17 trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, as well as mixtures thereof. Mixtures of any two or more surfactants can be used.

The optional surfactant can be present in any desired or effective amount, in embodiments, the surfactant is present in an amount of from about 0.01 to about 5 percent by weight, based on the total weight of the ink composition. It should be noted that the surfactants are named as dispersants in some cases.

The present self-crosslinked polymer dispersant is compatible with other post-crosslinkers. Optionally, the ink composition can further comprise post-crosslinkers. In embodiments, the crosslinker is an organoamine, a dihydroxy aromatic compound, isocyanate, a peroxide, a metal oxide, or the like, as well as mixtures thereof. Crosslinking can further enhance the physical properties of the images generated from the ink composition. The crosslinker can be present in any desired or effective amount, in embodiments from about 0.1 to about 20 percent, or from 5 to about 15 percent, by weight, based on the total weight of the ink composition.

The ink composition can further comprise additives. Optional additives that can be included in the ink compositions include biocides, fungicides, pH controlling agents such as acids or bases, phosphate salts, carboxylates salts, sulfite salts, amine salts, buffer solutions, and the like, sequestering agents such as EDTA (ethylenediamine tetra acetic acid), viscosity modifiers, leveling agents, and the like, as well as mixtures thereof.

In embodiments, the ink composition is a low-viscosity composition. The term "low-viscosity" is used in contrast to conventional high-viscosity inks such as screen printing inks, which tend to have a viscosity of at least 1,000 centipoise (cps). In specific embodiments, the ink disclosed herein has a viscosity of no more than about 100 cps, no more than about 50 cps, or no more than about 20 cps, or from about 2 to about 30 cps at a temperature of about 30° C., although the viscosity can be outside of these ranges. When used in ink jet printing applications, the ink compositions are generally of a viscosity suitable for use in said ink jet printing processes. For example, for thermal ink jet printing applications, at room temperature (i.e., about 25° C.), the ink viscosity is at least about 1 centipoise, no more than about 10 centipoise, no more than about 7 centipoise, or no more than about 5 centipoise, although the viscosity can be outside of these ranges. For piezoelectric ink jet printing, at the jetting temperature, the ink viscosity is at least about 2 centipoise, at least about 3 centipoise, no more than about 20 centipoise, no more than about 15 centipoise, or no more than about 10 centipoise, although the viscosity can be outside of these ranges. The jetting temperature can be as low as about 20 to 25° C., and can be as high as about 70° C., as high as about 50° C., or as high as about 40° C., although the jetting temperature can be outside of these ranges.

In certain embodiments, the ink compositions herein have a viscosity of from about 2 to about 20 centipoise at a temperature of about 30° C.

The ink compositions can be prepared by any suitable process, such as by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, in embodiments from about 5 to about 10 minutes. Alternatively, the optional ink additives can be mixed with the other ink ingredients during the ink preparation process, which takes place according to any desired procedure, such as by mixing all the ingredients, heating if desired, and filtering.

Also disclosed herein is a process which comprises applying an ink composition as disclosed herein to a substrate in an imagewise pattern. Also disclosed herein is a process which comprises applying an ink composition as disclosed herein to a substrate as an over coat, wherein the over coat can be clear, colored, or a combination thereof.

The ink compositions can be used in a process which entails incorporating the ink composition into an ink jet printing apparatus and causing droplets of the ink to be ejected in an imagewise pattern onto a substrate. In a specific embodiment, the printing apparatus employs a thermal ink jet process wherein the ink in the nozzles is selectively heated in an imagewise pattern, thereby causing droplets of the ink to be ejected in imagewise pattern. In another embodiment, the printing apparatus employs an acoustic ink jet process wherein droplets of the ink are caused to be ejected in imagewise pattern by acoustic beams. In yet another embodiment, the printing apparatus employs a piezoelectric ink jet process, wherein droplets of the ink are caused to be ejected in imagewise pattern by oscillations of piezoelectric vibrating elements. Any suitable substrate can be employed.

In a specific embodiment, a process herein comprises incorporating an ink prepared as disclosed herein into an ink jet printing apparatus, ejecting ink droplets in an imagewise pattern onto an intermediate transfer member, heating the image to partially or completely remove solvents, and transferring the ink in the imagewise pattern from the intermediate transfer member to a final recording substrate. In a specific embodiment, the intermediate transfer member is heated to a temperature above that of the final recording sheet and below that of the ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements.

Any suitable substrate or recording sheet can be employed as the final recording sheet, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, transparency materials, fabrics, textile products, plastics, polymeric films, inorganic substrates such as metals and wood, and the like. In embodiments, the substrate comprises a three-dimensional substrate. In embodiments, the substrate comprises medical devices such as catheters, thermometers, cardiac stents, programmable pace makers, other medical devices, menus, food packaging materials, cosmetic tools and products, and any other desired three-dimensional substrate. In further embodiments, the substrate comprises customizable digitally printed ID codes, short-run printable materials three-dimensional medical and any other desired three-dimensional substrate.

In embodiments, the aqueous ink jet ink composition provides an ink wherein the ink exhibits aging stability characterized by a fresh pigment particle size of the ink as measured by a NANOTRAC FLEX and a pigment particle size of the ink after three days of aging at 60° C.

Fresh pigment dispersion or ink means the dispersion or ink freshly prepared at room temperature. Three days of aging at 60° C. means holding the pigment dispersion or ink in a sealed glass vessel for three days at a temperature of 60° C.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Dispersant 2 is a commercial block polymeric dispersant available from BASF as DISPEX® Ultra PX 4575.

Example 1

Synthesis of the polymeric dispersant. 1.0 gram of asobisisobutyronitrile was dissolved in 25 grams of isopropanol in a 500 milliliter flask preheated to 82° C. under nitrogen. 5 grams of stearyl methacrylate, 2.5 grams of benzyl methacrylate, 4 grams of [3-(dimethylamino) propyl]methacrylamide, 2 grams of methacrylic acid, and 36 grams of poly(ethylene glycol) methyl ether methacrylate (50 weight percent in water, weight average molecular weight about 3,600) were dissolved in 100 grams of isopropanol. The obtained monomer solution was fed in the 500 milliliter flask at a rate of 2 milliliters/minute. The polymerization was kept at 82° C. for 4 hours after feeding all of the monomers. Subsequently, the solvents were removed under vacuum and water was added to adjust the solid content of the dispersant solution to 20 weight percent.

Example 2

Preparation of pigment dispersion. 20 parts of cyan, magenta, yellow, or black pigment (PV Fast Blue BG-NIP, Ink Jet Magenta E 02, Ink Jet Yellow 4G by Clariant, Raven 1180 by Birla Carbon), 20 parts of the dispersant solution of Example 1 (25 weight percent), and 60 parts of water were homogenized. The resulting dispersion was mixed with 400 parts of zirconia beads (0.3 millimeter) and milled using a paint shaker at 820 revolutions per minute (rpm) for 3 hours to give a pigment dispersion.

Example 3

Preparation of cyan ink. 51 parts (11.33 weight percent pigment) of the pigment dispersion of Example 2, 25 parts of 1,2-propanediol, 6 parts of 1,2-hexanediol, 4 parts (44 weight percent solids) of a latex resin (Joncryl® 537 acrylic emulsion available from BASF), 1 part surfactant BYK-3451), 0.1 part of Proxel® (isothiazolinone, 1,2-benzisothiazolin-3-one, preservative), 1 part wax dispersion (035 weight percent solid) (Joncryl® Wax-35), and 6 parts of water were mixed and filtered through a 1 micron glass membrane filter to remove any coarse particles. The obtained ink was subjected to various ink characterizations and initial Dimatix print test.

Example 4

Preparation of magenta ink. 51 parts (11.33 weight percent pigment) of the pigment dispersion of Example 2, 25 parts of 1,2-propanediol, 6 parts of 1,2-hexanediol, 4 parts (44 weight percent solid) of a latex resin (Joncryl® 537 acrylic emulsion available from BASF), 1 part surfactant (BYK-3451), 0.1 part of Proxel®, 1 part of wax dispersion (0.35 weight percent solid) (Joncryl® Wax-35), and 6 parts of water were mixed and filtered through a 1 micron glass membrane filter to remove any coarse particles. The obtained ink was subjected to various ink characterizations and initial Dimatix print test.

Example 5

Preparation of yellow ink. 51 parts (11.33 weight percent pigment) of the pigment dispersion of Example 2, 25 parts of 1,2-propanediol, 6 parts of 1,2-hexanediol, 4 parts (44 weight percent solid) of a latex resin (Joncryl® 537 acrylic emulsion available from BASF), 1 part surfactant (BYK-3451), 0.1 part of Proxel®, 1 part of wax dispersion (0.35 weight percent solid) (Joncryl® Wax-35), and 6 parts of water were mixed and filtered through a 1 micron glass membrane filter to remove any coarse particles. The obtained ink was subjected to various ink characterizations and initial Dimatix print test.

Example 6

Preparation of black ink. 51 parts (11.33 weight percent pigment) of the pigment dispersion of Example 2, 25 parts of 1,2-propanediol, 6 parts of 1,2-hexanediol, 4 parts (44 weight percent solid) of a latex resin (Joncryl® 537 acrylic emulsion available from BASF), 1 part surfactant (BYK-3451), 0.1 part of Proxel®, 1 part of wax dispersion (0.35 weight percent solid) (Joncryl® Wax-35), and 6 parts of water were mixed and filtered through a 1 micron glass membrane filter to remove any coarse particles. The obtained ink was subjected to various ink characterizations and initial Dimatix print test.

Comparative Example 7

Preparation of black ink using a commercial block copolymer dispersant. 51 parts (11.33 weight percent pigment) of a pigment dispersion prepared as in of Example 2 except with a commercial block polymeric dispersant available from BASF as DISPEX® Ultra PX 4575, 28.5 parts of 1,2-propanediol, 2.5 parts of 1,2-hexanediol, 9 parts (44 weight percent solid) of a latex resin (Joncryl® 537 acrylic emulsion available from BASF), 1 part surfactant (BYK-3451), 0.1 part of Proxel®, 1 part of wax dispersion (0.35 weight percent solid) (Joncryl® Wax-35), and 6 parts of water were mixed and filtered through a 1 micron glass membrane filter to remove any coarse particles. The obtained ink was subjected to various ink characterizations and initial Dimatix print test.

Characterization Results.

Ink Stability. The accelerated storage stability was determined by keeping the ink in an oven at 60° C., followed by measuring the particle size after a certain aging time using a Nanotrac particle size analyzer. "Nanotrac" is the model name of the particle size analyzer made by Microtrac. It uses dynamic light scattering technology. Table 1 shows pigment particle sizes of the cyan ink of Example 3 comprising a pigment dispersion containing the pigment dispersant of the present embodiments.

TABLE 1

| | Particle Size (nanometers) | | | |
| --- | --- | --- | --- | --- |
| | Mv | D10 | D50 | D95 |
| Fresh | 136.3 | 85.2 | 132.7 | 211.4 |
| 3 Days at 60° C. | 127.5 | 81.1 | 122.1 | 202.5 |
| 7 Days at 60° C. | 132 | 76.3 | 123.8 | 224.2 |

Table 2 shows pigment particle sizes of the magenta ink of Example 4 comprising a pigment dispersion containing the pigment dispersant of the present embodiments.

TABLE 2

| | Particle Size (nanometers) | | | |
|---|---|---|---|---|
| | Mv | D10 | D50 | D95 |
| Fresh | 186.6 | 96.9 | 180.5 | 315 |
| 3 Days at 60° C. | 183.2 | 90.1 | 175.9 | 322 |
| 7 Days at 60° C. | 179 | 91.4 | 169.3 | 319 |

Table 3 shows pigment particle sizes of the yellow ink of Example 5 comprising a pigment dispersion containing the pigment dispersant of the present embodiments.

TABLE 3

| | Particle Size (nanometers) | | | |
|---|---|---|---|---|
| | Mv | D10 | D50 | D95 |
| Fresh | 127.3 | 57.2 | 114.8 | 252.1 |
| 3 Days at 60° C. | 132 | 53.1 | 122.6 | 256.2 |
| 7 Days at 60° C. | 136.5 | 52.6 | 125.8 | 267.3 |

Table 4 shows pigment particle sizes of the black ink of Example 6 comprising a pigment dispersion containing the pigment dispersant of the present embodiments.

TABLE 4

| | Particle Size (nanometers) | | | |
|---|---|---|---|---|
| | Mv | D10 | D50 | D95 |
| Fresh | 131.6 | 72.1 | 126.1 | 222.9 |
| 3 Days at 60° C. | 122.1 | 72.3 | 113.8 | 209.8 |
| 7 Days at 60° C. | 119.4 | 72.9 | 111.1 | 202.9 |

Table 5 shows pigment particle sizes of the black ink of Comparative Example 7 comprising a pigment dispersion containing a commercial block copolymer dispersant.

TABLE 5

| | Particle Size (nanometers) | | | |
|---|---|---|---|---|
| | Mv | D10 | D50 | D95 |
| Fresh | 140.4 | 81.2 | 130.2 | 247.1 |
| 3 Days at 60° C. | 164.1 | 88.2 | 151.9 | 297.9 |
| 7 Days at 60° C. | gelled | | | |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A self-crosslinked polymeric dispersant comprising:
a copolymer comprising:
an acid group;
a base group;
a hydrophobic group selected from a member of the group consisting of an alkyl group having from about 4 to about 40 carbon atoms; an aromatic group; and combinations thereof; and
a steric hydrophilic group.

2. The polymeric dispersant of claim 1, wherein the acid group is selected from a member of the group consisting of carboxylic acid, phosphoric acid, sulphonic acid, phenol, aromatic nitrate, and combinations thereof.

3. The polymeric dispersant of claim 1, wherein the base group is selected from a member of the group consisting of an aromatic amine, an aliphatic amine, pyridine, imidazole, benzimidazole, histidine, guanidine, a phosphazene base, an ammonium base, a phosphonium base, an onium base, and combinations thereof.

4. The polymeric dispersant of claim 1, wherein the steric hydrophilic group comprises a member selected from the group consisting of polyethylene glycol, polypropylene glycol, and combinations thereof.

5. The polymeric dispersant of claim 1, wherein the steric hydrophilic group comprises polyethylene glycol having a weight average molecular weight of from about 500 to about 20,000.

6. The polymeric dispersant of claim 1, wherein the copolymer is of the structure:

wherein $m_1$ is an integer of from 1 to about 400;
wherein $m_2$ is an integer of from 0 to about 800;
wherein $m_3$ is an integer of from 1 to about 150;
wherein $m_4$ is an integer of from 1 to about 400;
wherein $m_5$ is an integer of from 1 to about 600;
wherein $L_1$ through $L_5$ are optional linking groups;
wherein $L_1$ is a linking group selected from a member of the group consisting of ether, urea, epoxy, ester, amide, oxygen, sulfur, carbon, and an alkyl chain of from about 1 to about 6 carbon atoms;
wherein $L_2$ is a linking group selected from a member of the group consisting of ether, urea, epoxy, ester, amide, oxygen, sulfur, carbon, and an alkyl chain of from about 1 to about 6 carbon atoms;
wherein $L_3$ is a linking group selected from a member of the group consisting of ether, urea, epoxy, ester, amide, oxygen, sulfur, carbon, and an alkyl chain of from about 1 to about 6 carbon atoms;
wherein $L_4$ is a linking group selected from a member of the group consisting of ether, urea, epoxy, ester, amide, oxygen, sulfur, carbon, and an alkyl chain of from about 1 to about 6 carbon atoms;
wherein $L_5$ is a linking group selected from a member of the group consisting of ether, urea, epoxy, ester, amide, oxygen, sulfur, carbon, and an alkyl chain of from about 1 to about 6 carbon atoms;
wherein $R_1$ is $-(CH_2)_{3-39}CH_3$;
wherein $R_2$ is an aromatic group having from 6 to about 40 carbon atoms;
wherein $R_3$ is $-(CH_2CH_2O)_m(CH_2CHCH_3O)_nR$, wherein m is about 10 to about 450, n is about 0 to about 80, and R is H or $CH_3$;
wherein $R_4$ is a base group selected from a member of the group consisting of an amine, a pyridine, an imidazole, a benzimidazole, a histidine, a guanidine, a phosphazene base, an ammonium base, a phosphonium base, and an onium base;

wherein $R_5$ is an acid group selected from a member of the group consisting of carboxylic acid, sulfonic acid, phosphonic acid, phenol, and aromatic nitrate; and wherein $R_1'$, $R_2'$, $R_3'$, and $R_4'$ are each independently selected from a member of the group consisting of H, an alkyl group having from 1 to about 5 carbon atoms, and an aromatic group having from 6 to about 30 carbon atoms, and $R_5'$ is selected from a member of the group consisting of H, an alkyl group having from 1 to about 5 carbon atoms, an aromatic group having from 6 to about 30 carbon atoms, an acid group selected from a member of the group consisting of carboxylic acid, sulfonic acid, phosphonic acid, phenol, and aromatic nitrate, and combinations thereof.

7. The polymeric dispersant of claim 1, wherein the equations $$0.05 < \frac{m_1(M_{R_1} + M_{R_1'}) + m_2(M_{R_2} + M_{R_2'})}{\sum_1^5 m_i(M_{R_i} + M_{R_i'})} < 0.8$$

and

$$\frac{m_4 M_{R_4}}{m_3 M_{R_3}} < 10$$

are used to define the dispersant components;
wherein $M_{R_1}$ is the molecular weight of the $R_1$ group;
wherein $M_{R_1'}$ is the molecular weight of the $R_1'$ group;
wherein $M_{R_2}$ is the molecular weight of the $R_2$ group;
wherein $M_{R_2'}$ is the molecular weight of the $R_2'$ group;
wherein $M_{R_i}$ is the molecular weight of the $R_i$ group;
wherein $M_{R_i'}$ is the molecular weight of the $R_i'$ group;
wherein i is 1 through 5 (that is $R_i = R_1, R_2, R_3, R_4, R_5$);
wherein $m_1$ is an integer of from 1 to about 400; $m_2$ is an integer of from 0 to about 800; $m_3$ is an integer of from 1 to about 150; $m_4$ is an integer of from 1 to about 400; and wherein $m_5$ is an integer of from 1 to about 600.

8. The polymeric dispersant of claim 1, wherein the polymeric dispersant is free of alkyl phenol ethoxylates.

9. A self-crosslinked polymeric dispersant comprising:
a copolymer comprising:
an acid group;
a base group;
a hydrophobic group; and
a steric hydrophilic group comprising a member selected from the group consisting of polyethylene glycol, polypropylene glycol, and combinations thereof.

10. A self-crosslinked polymeric dispersant comprising:
a copolymer comprising:
an acid group;
a base group;
a hydrophobic group; and
a steric hydrophilic group;
wherein the copolymer is of the structure:

wherein $m_1$ is an integer of from 1 to about 400;
wherein $m_2$ is an integer of from 0 to about 800;
wherein $m_3$ is an integer of from 1 to about 150;
wherein $m_4$ is an integer of from 1 to about 400;
wherein $m_5$ is an integer of from 1 to about 600;
wherein $L_1$ through $L_5$ are optional linking groups;
wherein $L_1$ is a linking group selected from a member of the group consisting of ether, urea, epoxy, ester, amide, oxygen, sulfur, carbon, and an alkyl chain of from about 1 to about 6 carbon atoms;
wherein $L_2$ is a linking group selected from a member of the group consisting of ether, urea, epoxy, ester, amide, oxygen, sulfur, carbon, and an alkyl chain of from about 1 to about 6 carbon atoms;
wherein $L_3$ is a linking group selected from a member of the group consisting of ether, urea, epoxy, ester, amide, oxygen, sulfur, carbon, and an alkyl chain of from about 1 to about 6 carbon atoms;
wherein $L_4$ is a linking group selected from a member of the group consisting of ether, urea, epoxy, ester, amide, oxygen, sulfur, carbon, and an alkyl chain of from about 1 to about 6 carbon atoms;
wherein $L_5$ is a linking group selected from a member of the group consisting of ether, urea, epoxy, ester, amide, oxygen, sulfur, carbon, and an alkyl chain of from about 1 to about 6 carbon atoms;
wherein $R_1$ is —$(CH_2)_{3-39}CH_3$;
wherein $R_2$ is an aromatic group having from 6 to about 40 carbon atoms;
wherein $R_3$ is —$(CH_2CH_2O)_m(CH_2CHCH_3O)R$, wherein m is about 10 to about 450, n is about 0 to about 80, and R is H or $CH_3$;
wherein $R_4$ is a base group selected from a member of the group consisting of an amine, a pyridine, an imidazole, a benzimidazole, a histidine, a guanidine, a phosphazene base, an ammonium base, a phosphonium base, and an onium base;
wherein $R_5$ is an acid group selected from a member of the group consisting of carboxylic acid, sulfonic acid, phosphonic acid, phenol, and aromatic nitrate; and
wherein $R_1'$, $R_2'$, $R_3'$, and $R_4'$ are each independently selected from a member of the group consisting of H, an alkyl group having from 1 to about 5 carbon atoms, and an aromatic group having from 6 to about 30 carbon atoms, and $R_5'$ is selected from a member of the group consisting of H, an alkyl group having from 1 to about 5 carbon atoms, an aromatic group having from 6 to about 30 carbon atoms, an acid group selected from a member of the group consisting of carboxylic acid, sulfonic acid, phosphonic acid, phenol, and aromatic nitrate, and combinations thereof.

11. A self-crosslinked polymeric dispersant comprising:
a copolymer comprising:
an acid group;
a base group;
a hydrophobic group; and
a steric hydrophilic group;
wherein the equations $$0.05 < \frac{m_1(M_{R_1} + M_{R_1'}) + m_2(M_{R_2} + M_{R_2'})}{\sum_1^5 m_i(M_{R_i} + M_{R_i'})} < 0.8$$

and

-continued
$$\frac{m_4 M_{R_4}}{m_3 M_{R_3}} < 10$$

are used to define the dispersant components;
  wherein $M_{R1}$ is the molecular weight of the $R_1$ group;
  wherein $M_{R1}'$ is the molecular weight of the $R_1'$ group;
  wherein $M_{R2}$ is the molecular weight of the $R_2$ group;
  wherein $M_{R2}'$ is the molecular weight of the $R_2'$ group;
  wherein $M_{Ri}$ is the molecular weight of the $R_i$ group;
  wherein $M_{Ri}'$ is the molecular weight of the $R_i'$ group;
  wherein i is 1 through 5 (that is $R_i = R_1, R_2, R_3, R_4, R_5$);
  wherein $m_1$ is an integer of from 1 to about 400; $m_2$ is an integer of from 0 to about 800; $m_3$ is an integer of from 1 to about 150; $m_4$ is an integer of from 1 to about 400; and wherein $m_5$ is an integer of from 1 to about 600.

\* \* \* \* \*